United States Patent
Matmour et al.

(10) Patent No.: US 9,481,755 B2
(45) Date of Patent: Nov. 1, 2016

(54) ANIONIC POLYMERIZATION INITIATOR, USE THEREOF FOR SYNTHESIZING A DIENE ELASTOMER HAVING AN ALKYNE FUNCTION AT THE CHAIN END, AND FUNCTIONALIZED DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Rachid Matmour, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/352,387

(22) PCT Filed: Oct. 16, 2012

(86) PCT No.: PCT/EP2012/070451
§ 371 (c)(1),
(2) Date: Apr. 17, 2014

(87) PCT Pub. No.: WO2013/057082
PCT Pub. Date: Apr. 25, 2013

(65) Prior Publication Data
US 2014/0243480 A1     Aug. 28, 2014

(30) Foreign Application Priority Data

Oct. 18, 2011 (FR) ...................... 11 59397

(51) Int. Cl.
| | |
|---|---|
| C08F 36/04 | (2006.01) |
| C08F 238/02 | (2006.01) |
| C08F 4/48 | (2006.01) |
| C08C 19/44 | (2006.01) |

(52) U.S. Cl.
CPC ............. *C08F 238/02* (2013.01); *C08C 19/44* (2013.01); *C08F 4/484* (2013.01); *C08F 36/04* (2013.01); *C08F 2438/01* (2013.01)

(58) Field of Classification Search
None
See application file for complete search history.

(56) References Cited

PUBLICATIONS

Mao, Journal of Organometallic Chemistry, 521 (1996) 425-428.*
Touris, Macromolecules, 2011, 44, 1886-1893, 2011.*
International Search Report for PCT/EP2012/070451 dated May 16, 2013.
Mao S S H et al: "Cross-conjugated polymers via condensation of a zirconocene alkynyl (benzune) derivative generated by thermolysis of Cp27rMe (C6H4C@?CsiMe3)", Journal of Organometallic Chemistry, Elsevier-Sequoia S.A. Lausanne, CH, vol. 521, No. 1, Aug. 23, 1996, pp. 425-428, XP004036395, ISSN: 0022-328X, DOI: 10.101610022-328X(96)0653-X cited in the application abstract.
Joji Ohshita et al: "Synthesis of Poly{[bis(ethynylphenyl) silylene]phenylene}s with Highly Heat-Resistant Properties", Macromolecules, vol. 32, No. 19, Sep. 1, 1999, pp. 5998-6002, XP055024239, ISSN: 0024-9297, DOI: 10.1021/ma990314a cited in the application scheme 1.

* cited by examiner

*Primary Examiner* — Robert C Boyle
(74) *Attorney, Agent, or Firm* — Dickinson Wright PLLC

(57) ABSTRACT

An anionic polymerization initiator of formula:

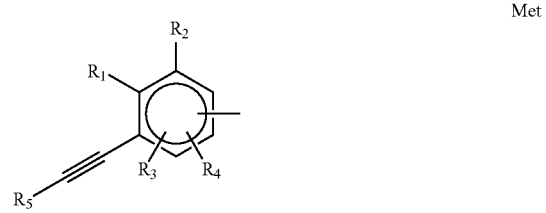

in which:
Met, which can be borne by the ortho, meta or para position, denotes an alkali metal, $R_1$ and $R_2$, and also $R_3$ and $R_4$, which can be borne by the ortho, meta or para position, denote a hydrogen atom or an alkyl, cycloalkyl, aryl or arylalkyl group, and $R_5$ denotes an alkyl, cycloalkyl, aryl or arylalkyl group or a protective group for the alkyne functional group.

The use of such a polymerization initiator makes possible the synthesis of a diene elastomer bearing, at one or each of its chain ends, a group comprising an alkyne functional group with a high degree of functionalization.

4 Claims, No Drawings

ANIONIC POLYMERIZATION INITIATOR, USE THEREOF FOR SYNTHESIZING A DIENE ELASTOMER HAVING AN ALKYNE FUNCTION AT THE CHAIN END, AND FUNCTIONALIZED DIENE ELASTOMER

This application is a 371 of PCT/EP2012/070451, filed 16 Oct. 2012, which claims benefit of FR 1159397, filed 18 Oct. 2011, the entire contents of which is incorporated herein by reference for all purposes.

BACKGROUND

1. Field

Disclosed herein is a novel acetylene-monofunctional organometallic initiator and its use in the synthesis of a diene elastomer carrying a reactive acetylene functional group at one or each of its chain ends.

2. Description of Related Art

The synthesis of block copolymers is not always simple to control, in particular when one of the monomers may be involved in secondary reactions. The synthesis of block diene copolymers is not free from this difficulty. Various methods of synthesis are generally employed to prepare such block copolymers.

Thus, according to one method of synthesis, the two monomers are successively polymerized by anionic polymerization. This is one of the most well known methods to a person skilled in the art, which consists in polymerizing the diene monomer by the anionic route and then using the elastomer (living anionic chain) thus obtained as macroinitiator for the polymerization of the second monomer, still by the anionic route. Certain difficulties may occur, depending on the nature of the second monomer. Thus, during the second stage of anionic polymerization, side reactions brought about by the presence of certain functional groups on the second monomer may compete with the polymerization. By way of example, if an ester functional group is present on the second monomer, the polymerization can be accompanied by an addition-elimination reaction which halts the growth of the chains of the second block and modifies the chemical structure of the final product and thus consequently its properties.

Moreover, the anionic polymerization of some monomers, such as (meth)acrylates, is highly exothermic and the kinetics of polymerization are very rapid (of the order of a minute). Many studies have been published relating to additives (LiCl or ROLi, for example) which make it possible to reduce the reactivity of the chain end by complexing and thus the proportion of secondary reactions, with greater or less success. It is thus not easy to control the anionic polymerization of such monomers. Another method, developed by Stadler et al. (Macromolecules, 1995, 28, 3080-3097; Macromolecules, 1995, 28, 4558) and Teyssie and Elf Atochem (Patents EP 0 749 987 B1 and EP 0 524 054 B1), is the use of diphenylethylene (DPE) at the end of the polymerization of the diene monomer and the decrease in the reaction temperature (−40° C., for example), making it possible to obtain a lithiated macroinitiator which is much less reactive during the initiation of the second (meth)acrylic monomer. Despite a reactivity reduced by the use of DPE and/or of a lithium salt (LiCl or ROLi, for example) and of a low temperature, it is often difficult to completely prevent the side reactions and the control of the anionic polymerization of the second monomer can remain complicated.

Another method of synthesis of block diene copolymers is the combination of an anionic polymerization and of atom transfer radical polymerization (ATRP). The synthesis of a first diene block by anionic polymerization can be followed by a termination reaction which makes it possible to obtain a polymer functionalized at the chain end by a halogenated group; this halogen atom would make possible the initiation of the ATRP of the second monomer. The functionalization of the anionic chain end by a halogen atom, for example bromine, can be carried out in two stages: (a) the reaction of the living lithiated anionic chain with an epoxide, with the aim of replacing the carbanion by a lithiated oxanion which is less reactive with regard to nucleophilic substitutions, (b) the oxanion will, in a second step, react with the halogenated compound, for example 2-bromo-2-methylpropanoyl bromide (only the acid bromide reacts by virtue of the decrease in reactivity of the anionic chain end). The polymer functionalized at the chain end by a halogenated group might then act as macroinitiator for the ATRP. This synthetic route was used by Matyjaszewski et al. (Macromol. Chem. Phys., 1999, 200, 1094-1100) for the synthesis of PS-b-PMMA block copolymer.

Nevertheless, this method proves to exhibit numerous difficulties depending on the monomers used. This is because, when the halogenated compound used to functionalize the diene elastomer resulting from the anionic polymerization exhibits two halogenated sites, as is the case with 2-bromo-2-methylpropanoyl bromide, the functionalization can also result in coupling of the living anionic chain by reaction of two living diene elastomer chains with the bihalogenated compound. In addition, a major obstacle to this method of synthesis originates from the presence of pendant double bonds in the diene polymer. This is because, during the ATRP of the second monomer, radical addition reactions on the double bonds of the diene elastomer take place, resulting in the change in the macrostructure, indeed even in crosslinking, resulting in the formation of a gel. Good control of the radical polymerization is thus impossible.

SUMMARY

These disadvantages have in particular been demonstrated by the Applicant Companies during various tests employing butadiene and methyl methacrylate as monomers.

The inventors have developed a method of synthesis of diene copolymers comprising at least two blocks, one of which is a diene elastomer block, which is adaptable whatever the nature of the monomers employed in this synthesis, while overcoming in particular the abovementioned disadvantages. This process carries out a reaction of the two polymer blocks, each obtained according to a polymerization method perfectly suited to the nature of the monomers. This makes it possible to overcome the disadvantages encountered with the methods of synthesis envisaged above. In addition, this process of synthesis makes it possible to obtain the copolymers, the macrostructure of which is controlled, while achieving high yields. The process is characterized in that it comprises a stage of reaction of two polymers defined as being:

a) a diene elastomer bearing an alkyne functional group at one or each of its chain ends, and b) a polymer bearing, at one of its chain ends, at least one azide functional group.

The introduction of a functional group into a diene elastomer can be carried out by an anionic polymerization of the diene monomer with an organometallic initiator bearing such a functional group. Suitable in particular as organometallic initiators bearing an alkyne functional group are those comprising a carbon-lithium bond. Two compounds capable of introducing an alkyne functional group have been described in the literature, namely 5-trimethylsilyl-4-pentynyllithium (TMSPLi) and 5-triethylsilyl-4-pentynyllithium (TESPLi), which are described in the papers Macromolecules 2011, 44, 1886-1893 and Macromolecules 2011, 44, 1969-1976. Nevertheless, it has been found, by the inventors, that the use of 5-trimethylsilyl-4-pentynyllithium brings about the deactivation of the living chains of diene polymers via their reaction with the neighbouring proton of the acetylene. According to the inventors, this reaction was the consequence of the inefficiency of the protection of the carbon-carbon triple bond by the trimethylsilyl group. These side reactions do not make it possible to control the polymerization of the monomers and in particular do not make possible a homogeneity in the sizes of elastomer chains and their microstructure. In addition, such side reactions also limit the content of living polymer, which is problematic for subsequent functionalization reactions, which will thus be only partial and nonquantitative.

The technical problem which is posed is thus that of the search for means for introducing an alkyne functional group into at least one chain end of a diene elastomer not exhibiting the abovementioned disadvantages.

The present disclosure makes it possible to solve this problem in that the inventors have developed a novel monofunctional initiator of anionic polymerization capable of introducing an alkyne functional group at the chain end of a diene elastomer with a high functionalization yield which can reach 100%. The polymerization takes place in a controlled and reproducible way without damaging possible postpolymerization reactions, such as functionalization reactions.

An embodiment of the present invention is an aromatic anionic polymerization organometallic initiator comprising a carbon-carbon triple bond.

Another embodiment of the invention is a process for the synthesis of a diene elastomer bearing an alkyne functional group at one or each of its chain ends employing this novel organometallic initiator.

A further embodiment of the invention is a diene elastomer bearing an alkyne functional group at one or each of its chain ends.

Thus, an embodiment of the invention is an aromatic anionic polymerization organometallic initiator comprising a carbon-carbon triple bond of following formula 1:

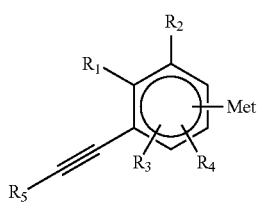

Formula 1 where

Met, which can be borne by the ortho, meta or para position with respect to the group comprising the carbon-carbon triple bond, denotes an alkali metal, preferably Li, Na or K, or a stannyllithium SnLi group; preferably, Met denotes a lithium atom, and $R_1$ and $R_2$, and also $R_3$ and $R_4$, which can be borne by the ortho, meta or paraposition, denote, independently of one another, a hydrogen atom, a $C_1$-$C_{15}$ alkyl group, a cycloalkyl group, a $C_6$-$C_{15}$ aryl group or a $C_7$-$C_{15}$ arylalkyl group which can be separated from the aromatic nucleus by a heteroatom, such as O or S and preferably $R_1$, $R_2$, $R_3$ and $R_4$ each denote a hydrogen atom, $R_5$ denotes a $C_1$-$C_{15}$ alkyl group, a cycloalkyl group, a $C_6$-$C_{15}$ aryl group, a $C_7$-$C_{15}$ arylalkyl group or a protective group for the alkyne functional group.

Mention may be made, as protective group for the alkyne functional group, of any protective group known for this purpose, in particular a hydrocarbon group comprising a silicon atom which is preferably a trialkylsilyl group, the alkyl group having from 1 to 5 carbon atoms, and more preferably the trimethylsilyl group. The nature of the substituents of the silicon atom does not have an impact on the polymerization, contrary to what was observed with the initiators of the prior art.

DETAILED DESCRIPTION OF SPECIFIC EMBODIMENTS

According to specific embodiments of the invention, the anionic polymerization initiator corresponds to the formula 1 in which at least one of the following characteristics is adhered to, preferably two and more preferably the three:

Met denotes a lithium atom $R_1$, $R_2$, $R_3$ and $R_4$ each denote a hydrogen atom $R_5$ denotes a trialkylsilyl group, the alkyl group having from 1 to 5 carbon atoms, more preferably the trimethylsilyl group.

According to these specific embodiments, the anionic polymerization initiator is very particularly chosen from trimethylsilylethynylphenyllithium compounds, it being possible for the trimethylsilyl group to be in the ortho, meta or paraposition with respect to the group comprising the carbon-carbon triple bond. These compounds correspond to the following formulae (A), (B) and (C):

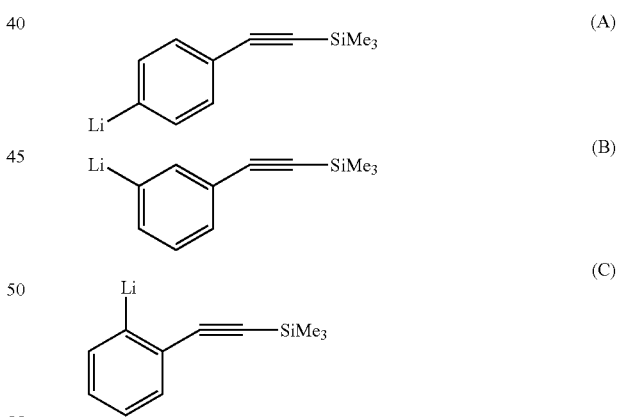

The compounds of formulae (A) and (B) have been described in the literature. To the knowledge of the Applicant Companies, no application to the anionic polymerization of diene monomer as initiator has been envisaged in the past. The major applications of these organometallic compounds known to a person skilled in the art consist of the use of alkyne-functional lithium salt for the chemical modification of polycarbosilanes in order to improve their temperature stability properties in the field of ceramics (Macromolecules, 1999, 32(19), 5998-6002) or for the synthesis of oligomer of formula [$Cp_2ZrMe(C_6H_3C{\equiv}CSiMe_3$]$_n$ by reaction of the lithium salt with the compound $Cp_2ZrMeCl$ and thermolysis (Journal of Organometallic Chemistry, 1996, 521(1-2), 425-28).

Although able to be synthesized in the presence of all types of inert solvent, the anionic polymerization initiator comprising an alkyne functional group according to the invention exhibits the advantage of being able to be synthesized in a nonaromatic solvent, such as hexane. This is because the compounds of the state of the art, namely 5-trimethylsilyl-4-pentynyllithium (TMSPLi) and 5-triethylsilyl-4-pentynyllithium (TESPLi), appear to be able to be synthesized only in the presence of benzene, the use of hexane resulting in a side reaction of intramolecular cyclization and thus an inactivity of the entity generated with regard to the polymerization. The carcinogenic nature of the solvents provided by this method of synthesis does not make it possible to envisage the use on the industrial scale of such a type of initiator.

This synthesis can be carried out by a halogen/alkali metal exchange reaction by reaction of a halogenated compound comprising the alkyne functional group with a metal derivative which can be the alkali metal in the metallic form or an organic salt of an alkali metal.

Suitable in particular among the organic salts of an alkali metal are those comprising a carbon/alkali metal bond. An organic salt not comprising a heteroatom will preferably be used. According to a preferred embodiment of the invention, the alkali metal is lithium. Mention may be made, among organic salts of lithium, as representative compounds, of aliphatic organolithium derivatives, such as ethyllithium, n-butyllithium (n-BuLi), isobutyllithium, dilithium polymethylenes, such as 1,4-dilithiobutane, and the like.

The reaction of the halogenated compound comprising the alkyne functional group with the metal derivative can be carried out in an inert solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, or the mixtures of these solvents. It is obvious that it will be preferable to use a solvent of aliphatic or alicyclic hydrocarbon type for reasons of health and safety.

The preparation of the polymerization initiator can be carried out in the presence or absence of a polar additive, it being possible for several types of polar agents to be used, including nonchelating polar agents of THF type and chelating polar agents having, on at least two atoms, at least one nonbonding pair, such as, for example, of tetrahydrofurfuryl ethyl ether or tetramethylethylenediamine type.

The synthesis of the polymerization initiator is generally carried out at a temperature of between 20° C. and 120° C. and preferably in the vicinity of 20° C. to 40° C.

According to an alternative form of the invention, the polymerization initiator can be prepared beforehand separately and in isolated fashion from the polymerization medium.

According to another alternative form of the invention, the initiator can be generated in situ directly in the polymerization medium by contact of the halogenated compound with the metal derivative.

Reference may be made, by way of illustration of this process for the synthesis of the polymerization initiator according to embodiments of the invention, to the procedure described by Shirai, Yasuhiro et al. in the paper Journal of the American Chemical Society, 2006, 128(41), 13479-13489. The compound is generated by a halogen/lithium exchange reaction between the brominated precursor and tert-BuLi in THF at −80° C. This reaction is illustrated below:

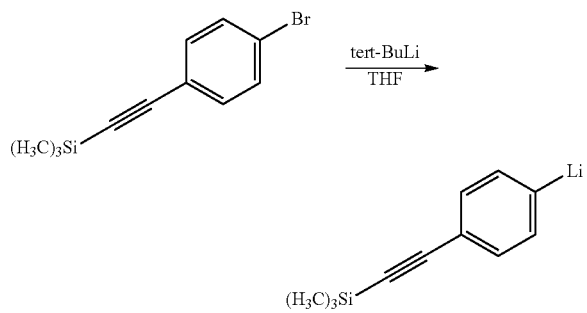

The polymerization initiator according to embodiments of the invention makes it possible to initiate the anionic polymerization of diene monomers in order to prepare diene elastomers bearing an alkyne functional group at one or each of their chain ends. The polymerization is preferably carried out in a way known per se in the presence of an inert solvent which can, for example, be an aliphatic or alicyclic hydrocarbon, such as pentane, hexane, heptane, isooctane, cyclohexane, methylcyclohexane, or an aromatic hydrocarbon, such as benzene, toluene or xylene, or mixtures of these solvents.

The content of polymerization initiator according to embodiments of the invention necessary for the polymerization of the monomers is similar to the content used with a conventional initiator of the aliphatic organolithium initiator type, such as n-butyllithium, for example. This content depends essentially on the molar mass targeted for the elastomer and can be easily determined by a person skilled in the art.

The microstructure of the elastomers can be determined by the presence or absence of a polar and/or randomizing agent and the amounts of polar and/or randomizing agent employed. Thus, the solution to be polymerized can also comprise a polar agent of ether type, such as tetrahydrofuran, or of amine type, such as tetramethylethylenediamine. Several types of polar agents can be used, including nonchelating polar agents of THF type and chelating polar agents having, on at least two atoms, at least one nonbonding pair, such as, for example, of tetrahydrofurfuryl ethyl ether or tetramethylethylenediamine type. It is also possible to add randomizing agents, such as sodium alkoxides. The amount of these compounds can easily be determined by a person skilled in the art according to the microstructure desired for the elastomer.

The polymerization can be carried out continuously or batchwise. The polymerization is generally carried out at a temperature of between 20° C. and 120° C. and preferably in the vicinity of 30° C. to 90° C., particularly from 30° C. to 50° C.

The polymerization reaction makes it possible to prepare a living diene elastomer bearing, at the chain end, a group of formula 2:

Formula 2

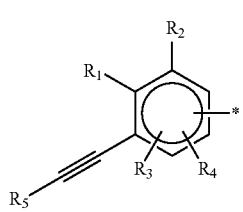

$R_1$, $R_2$, $R_3$, $R_4$ and $R_5$ being as defined above and
* denoting a point of bonding with the elastomer chain.

The yield for functionalization with hydrocarbon group comprising alkyne functional group observed with the polymerization initiator according to the invention is at least 80% and at most 100%.

According to an alternative form of the invention, the polymerization reaction is subsequently halted by the deactivation of the living chains in the way known per se. A diene elastomer bearing, at one chain end, an alkyne functional group is thus obtained.

According to another alternative form of the invention, the living diene elastomer resulting from the polymerization reaction and comprising an alkyne functional group at the nonreactive end of the chain can subsequently be functionalized in order to prepare a functionalized, coupled or star-branched diene elastomer according to the nature of the functionalization agent used. This post-polymerization functionalization is carried out in a way known per se.

The functionalization reaction of the living diene elastomer can take place at a temperature of between −20° C. and 100° C. by addition of a functionalization, coupling and/or star-branching agent to the living polymer chains or vice versa.

As the case may be, the reaction can be carried out in solution or in the gas phase, as described, for example, in Patent EP 1 072 613 B1, which relates to the functionalization by carbon dioxide for the purpose of obtaining monocarboxylic acid polymers.

The functionalization agents can, for example, introduce one or more nonpolar functional groups into the elastomer. Such agents are known per se, such as, for example, $Me_2SiCl_2$, $MeSiCl_3$, $SiCl_4$, 1,6-bis(trichlorosilyl)hexane, $Bu_2SnCl_2$, $SnCl_4$, and the like.

The functionalization agents can also introduce one or more polar functional groups into the elastomer. The polar functional group can be chosen, for example, from functional groups of amine, silanol, alkoxysilane, alkoxysilane bearing an amine group, epoxide, ether, ester, hydroxyl or carboxylic acid type, and the like. These functional groups improve in particular the interaction between an inorganic filler and the elastomer.

It is possible to obtain a mixture of elastomer chains bearing, in addition to the alkyne functional group common to all the chains, different functional groups as successively reacting different functionalization agents. For example, it is possible to react in a first step, the living chains with a coupling or star-branching agent and then to react the remaining living chains with a functionalization agent which introduces a functional group at the chain end.

It should be understood that, when the living diene elastomer chains react with a functionalization, coupling or star-branching agent, the diene elastomer will comprise as many alkyne functional groups as living chains which have been functionalized, coupled or star-branched, these alkyne functional groups being located at the end of the chains. Thus, the diene elastomer according to the invention bears a group comprising, at one or each of its chain ends, an alkyne functional group according to the post-polymerization reaction undergone.

The group resulting from the post-polymerization functionalization can be located at the chain end. It will then be said that the diene elastomer bearing an alkyne functional group at one chain end is functionalized at the other chain end. This is generally an elastomer obtained by reaction of a living elastomer with a functionalization agent, that is to say any at least monofunctional molecule, the functional group being any type of chemical group known by a person skilled in the art to react with a living chain end.

The group resulting from the post-polymerization functionalization can be located in the linear main elastomer chain. It will then be said that the diene elastomer is coupled and bears an alkyne functional group at each of its two chain ends. This is generally an elastomer obtained by reaction of a living elastomer with a coupling agent, that is to say any at least difunctional molecule, the functional group being any type of chemical group known by a person skilled in the art to react with a living chain end.

The group resulting from the post-polymerization functionalization can be central, to which n elastomer chains or branches (n>2) are bonded, forming a star-branched structure of the elastomer. It will then be said that the diene elastomer is a star-branched diene elastomer comprising n branches and bears an alkyne functional group at each of its n chain ends. It is generally an elastomer obtained by reaction of a living elastomer with a star-branching agent, that is to say any polyfunctional molecule, the functional group being any type of chemical group known by a person skilled in the art to react with a living chain end.

According to the preferred embodiment of the invention according to which $R_5$ denotes a protective group for the alkyne functional group, the process for the synthesis of the diene elastomer bearing, at one or each of its chain ends, a group comprising an alkyne functional group can comprise a stage for deprotecting the alkyne functional group by means known per se. This stage is carried out after the halting of the polymerization or of the post-polymerization functionalization. It is possible, by way of example, to react the chains functionalized by the protected alkyne group with an acid, a base, a fluorinated derivative, such as tetrabutylammonium fluoride, a silver salt, such as silver nitrate, and the like, in order to deprotect the alkyne functional group. These different methods are described in the work Protective Groups in Organic Synthesis, T. W. Green and P. G. M. Wuts, third edition, 1999. By way of illustration, $R_5$ represents a hydrogen atom on conclusion of this stage.

According to this same preferred embodiment of the invention, the protective group for the alkyne functional group is retained for the purpose of masking the reactivity of the functional group during a subsequent use of the elastomer.

Diene elastomer capable of being obtained by implementation of the process in accordance with the invention is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms.

Suitable in particular as conjugated dienes are 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like.

Suitable in particular as vinylaromatic compounds are styrene, ortho-, meta- or para-methylstyrene, the "vinyltoluene" commercial mixture, para(tert-butyl)styrene, methoxystyrenes, vinylmesitylene, divinylbenzene, vinylnaphthalene, and the like.

The copolymers can comprise between 99% and 20% by weight of diene units and from 1% to 80% by weight of vinylaromatic units.

The diene elastomer bearing, at one or each of its chain ends, a group comprising an alkyne functional group in accordance with the invention is preferably selected from the group of the highly unsaturated diene elastomers consisting of polybutadienes (BR), synthetic polyisoprenes (IRs), butadiene copolymers, isoprene copolymers and the mixtures of these elastomers. Such copolymers are more preferably selected from the group consisting of butadiene copolymers and isoprene copolymers, more particularly butadiene/styrene copolymers (SBRs), isoprene/butadiene copolymers (BIRs), isoprene/styrene copolymers (SIRs) and isoprene/butadiene/styrene copolymers (SBIRs). Such copolymers are more preferably chosen from butadiene/styrene copolymers (SBRs).

Suitable in particular are polybutadienes having a content (mol %) of 1,2-units of between 4% and 80% or those having a content (mol %) of cis-1,4-units of greater than 80%, polyisoprenes, butadiene/styrene copolymers, in particular those having a Tg (glass transition temperature, measured according to ASTM D3418) between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C.

In the case of butadiene/styrene/isoprene copolymers, suitable in particular are those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C.

The diene elastomer can be random, sequential or microsequential. It can have any appropriate microstructure, which depends on the specific conditions under which the polymerization reaction is carried out, such as the presence or absence of a polar and/or randomising agent and the amounts of polar and/or randomising agent employed. These aspects are known and controlled by a person skilled in the art.

Thus, according to an embodiment of the invention, a diene elastomer corresponding to the following formula 3, bearing, at one or each of its chain ends, a group comprising an alkyne functional group:

(A-E)$_n$-X where:

X denotes a hydrocarbon group of valency n or a group resulting from a functionalization, coupling and star-branching agent comprising at least one atom chosen from O, N, Si or Sn;

A is a monovalent radical corresponding to the following formula 2:

Formula 2

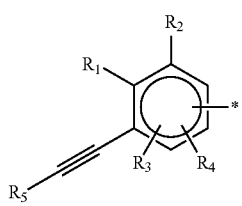

in which:

$R_1$ and $R_2$, and also $R_3$ and $R_4$, which can be borne by the ortho, meta or para position, denote, independently of one another, a hydrogen atom, a $C_1$-$C_{15}$ alkyl group, a $C_5$-$C_{15}$ cycloalkyl group, a $C_6$-$C_{15}$ aryl group or a $C_7$-$C_{15}$ arylalkyl group which can be separated from the aromatic nucleus by a heteroatom, such as O or S, and $R_1$, $R_2$, $R_3$ and $R_4$ each preferably denote a hydrogen atom, $R_5$ denotes a hydrogen atom, a $C_1$-$C_5$ alkyl group, a cycloalkyl group, a $C_6$-$C_{15}$ aryl group, a $C_7$-$C_{15}$ arylalkyl group or a protective group for the alkyne functional group, and

* denotes a point of bonding with the elastomer chain E, which can be borne by the ortho, meta or para position of A with respect to the group comprising the carbon-carbon triple bond, denotes the diene elastomer, and n is an integer ranging from 1 to 12, preferably from 1 to 4, is obtained.

This diene elastomer bearing an alkyne functional group at one or each of its chain ends also forms the subject-matter of the invention.

According to alternative forms of the invention, X comprises an amine, silanol, alkoxysilane, alkoxysilane bearing an amine group, epoxide, ether, ester, hydroxyl or carboxylic acid group.

According to other alternative forms of the invention, X comprises an Sn atom or an Si atom. According to these alternative forms, n is generally at least 2 and preferably 2, 3 or 4.

According to another alternative form of the invention, the diene elastomer is composed of a blend or mixture of diene elastomers bearing, at one or each of its chain ends, a group corresponding to the formula 2 comprising an alkyne functional group.

It is understood that these different alternative forms of the invention can be combined with one another.

The diene elastomer bearing, at one or each of its chain ends, a group comprising an alkyne functional group in accordance with the invention is obtained with a high degree of functionalization. The term "high" is understood to mean a degree of functionalization of at least 80%, indeed even of at least 90%, which can reach 100%. In addition, the diene elastomer bearing, at one or each of its chain ends, a group comprising an alkyne functional group in accordance with embodiments of the invention is obtained with well controlled characteristics (molar mass, polydispersity, microstructure and macrostructure).

This diene elastomer is entirely suitable for the synthesis of block copolymers according to the novel method developed by the inventors by 1,3-dipolar reaction with at least one block of another polymer having an azide functional group at one or each of its chain ends. Due to the high degree of functionalization obtained with the process of embodiments of the invention, the coupling yield, that is to say the yield for synthesis of block copolymer, is itself high and approaches 100%.

The abovementioned characteristics of embodiments of the present invention, and also others, will be better understood on reading the description of the exemplary embodiment of the invention, given by way of illustration and without implied limitation.

EXEMPLARY EMBODIMENT OF THE INVENTION

Measurements and Tests Used

Experimental techniques used for the characterization before curing of the polymers obtained:

(a) Determination of the distribution of molar masses by the triple-detection size exclusion chromatography (3D-SEC) technique.

1) Principle of the measurement:

Size exclusion chromatography (SEC) makes it possible to separate macromolecules in solution according to their size through columns filled with a porous gel. The macromolecules are separated according to their hydrodynamic volume, the bulkiest being eluted first.

In combination with 3 detectors (3D), a refractometer, a viscometer and a 90° light scattering detector, SEC makes it possible to grasp the distribution of absolute molar masses of a polymer. The different absolute number-average (Mn) and weight-average (Mw) molar masses and the polydispersity index (PI=Mw/Mn) can also be calculated.

2) Preparation of the polymer:

There is no specific treatment of the polymer sample before analysis. The latter is simply dissolved in tetrahydrofuran+1% by volume of diisopropylamine+1% by volume of triethylamine at a concentration of approximately 1 g/l. The solution is then filtered through a filter with a porosity of 0.45 μm before injection.

3) 3D-SEC analysis:

The apparatus used is a Waters Alliance chromatograph. The elution solvent is tetrahydrofuran+1% by volume of diisopropylamine+1% by volume of triethylamine, the flow rate is 0.5 ml/min and the temperature of the system is 35° C. A set of four Polymer Laboratories columns in series is used, these columns having the trade names: two Mixed A LS and two Mixed B LS.

The injected volume of the solution of the polymer sample is 100 μl. The detection system used is TDA 302 from Viscotek. It is composed of a differential refractometer, of a differential viscometer and of a 90° light scattering detector. For these 3 detectors, the wavelength is 670 nm. For the calculation of the average molar masses, the value of the increment in refractive index dn/dC of the polymer solution is integrated, which value is defined beforehand in tetrahydrofuran+1% by volume of diisopropylamine+1% by volume of triethylamine at 35° C. and 670 nm. The software for making use of the data is the Omnisec system from Viscotek.

(b) The glass transition temperatures Tg of the polymers are measured using a differential scanning calorimeter. The analysis is carried out according to the requirements of Standard ASTM D3418-08.

(c) The NMR analyses are carried out on a Bruker Avance 500 MHz spectrometer equipped with a 5 mm BBIz-grade "broad band" probe. The quantitative $^1$H NMR experiment uses a simple 30° pulse sequence and a repetition time of 3 seconds. The samples are dissolved in carbon disulfide ($CS_2$). 100 μl of deuterated cyclohexane ($C_6D_{12}$) are added for the lock signal.

The $^1$H NMR spectrum makes it possible to quantify the $(CH_3)_3Si$ units by integration of the signal characteristic of the $SiCH_3$ protons between 0.20 ppm and 0.10 ppm.

The $^1$H-$^{29}$Si HMQC 2D NMR spectrum makes it possible to confirm the nature of the functional group by virtue of the chemical shift values of the silicon cores and of the protons in the 2J vicinity (via 2 bonds).

(d) Near infrared (NIR) spectroscopy is used to quantitatively determine the microstructure of the elastomer (relative distribution of the 1,2-vinyl, trans-1,4 and cis-1,4 butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The microstructure is then calculated from the NIR spectrum of an elastomer film having a thickness of approximately 730 μm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

Middle-infrared spectroscopy makes it possible to qualitatively demonstrate the consumption of the alkyne and azide functional groups during the click reaction. The spectrum is acquired in transmission mode between 4000 and 400 cm$^{-1}$ with a resolution of 2 cm$^{-1}$ using a Vertex 70-2 Fourier-transform spectrometer equipped with a DTGS detector.

EXAMPLE 1

Synthesis of Protected Acetylene-Functional Polybutadiene According to the Invention

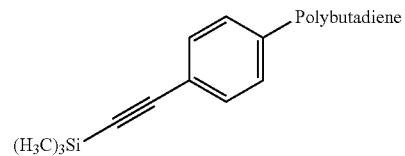

A/Synthesis of the Initiator According to the Invention

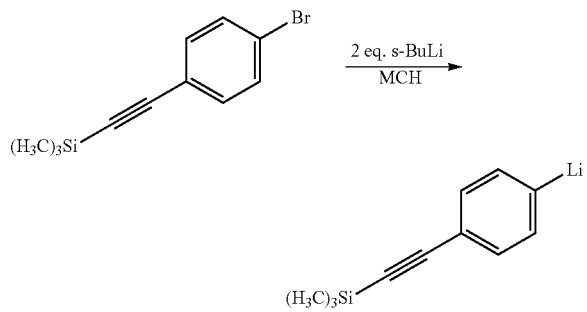

The protected acetylene-functional initiator is prepared by dissolution of 1.9 g (7.5×10$^{-3}$ mol) of 1-bromo-4-(trimethylsilylethynyl)phenyle in 65 ml of methylcyclohexane at ambient temperature under nitrogen, followed by the addition of 0.11 ml of tetramethylethylenediamine and 11.7 ml (15×10$^{-3}$ mol) of a 1.28 mol/l s-BuLi solution. The halogen/lithium exchange reaction is left stirring at ambient temperature for 45 minutes and then the initiator solution is assayed by Gilman-type assaying. The concentration of active entity is 0.114 mol/l.

B/Synthesis of the Protected Acetylene-Functional Polybutadiene

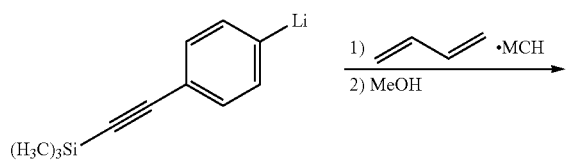

-continued

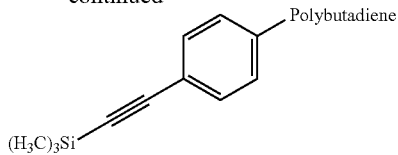

Anionic polymerization is carried out in a capped bottle with moderate stirring and under an inert nitrogen atmosphere. Before beginning the polymerization, 94 ml of methylcyclohexane are introduced into the bottle. The bottle is capped and sparging with nitrogen is carried out for 10 minutes. 15 ml of butadiene are subsequently injected into the bottle. A preneutralization of the impurities is carried out by metered addition of n-BuLi directly onto the mixture of monomer, solvent and optionally polar agent.

The initiator solution is added to this preneutralized mixture of solvent and butadiene. The temperature of the reaction medium is 40° C. At the end of polymerization, a solution of methanol in solution in methylcyclohexane is added to the living polymer in order to protonate the living chains.

The polymer solution is subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine and then the polymer is dried by stoving at 60° C. for 1 day. It can also be used directly in solution for the stage of deprotection of the acetylene functional group.

The degree of conversion is 80%. The functionalization yield, quantified by $^1$H NMR, is 90%. The polybutadiene exhibits a molar content of vinyl unit of 31%. The SEC characterizations indicate an Mn=54 000 g/mol and a PI=1.11. The IR analysis shows the presence of a band at approximately 2159 cm$^{-1}$ corresponding to the vibrational band of the protected acetylene. The Tg of the polymer is −79° C.

EXAMPLE 2

Synthesis of Acetylene-Functional Polybutadiene from the Protected Acetylene-Functional Polybutadiene

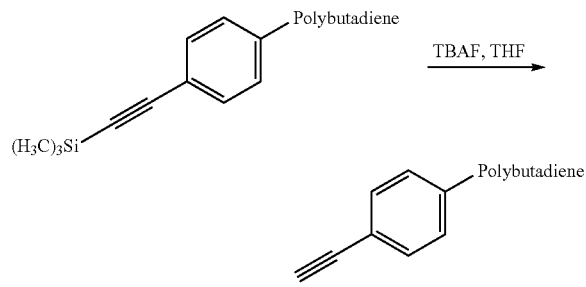

2 g of polybutadiene (Mn=54 000 g/mol and PI=1.11) are dissolved in 12 ml of THF. 0.37 ml (0.37 mmol) of a 1M solution of TBAF in THF is added to the polymer solution. The reaction medium is left stirring at ambient temperature for 24 h and then the polymer is precipitated from methanol. The polymer is redissolved in toluene and then subjected to an antioxidizing treatment by addition of 0.2 part by a hundred parts of elastomers (pch) of 4,4'-methylenebis(2,6-di(tert-butyl)phenol) and 0.2 part per hundred parts of elastomers (phr) of N-(1,3-dimethylbutyl)-N'-phenyl-p-phenylenediamine. The polymer is dried by stoving at 60° C. for 1 day and 1.8 g of polymer are recovered.

The deprotection yield, estimated by $^1$H NMR, is 100%. The IR analysis demonstrates the disappearance of the band at 2159 cm$^{-1}$ and the presence of a new band at approximately 2110 cm$^{-1}$ corresponding to the vibrational band of the deprotected acetylene.

The polybutadiene bearing an alkyne functional group at the chain end in accordance with the invention is thus obtained.

This polybutadiene is perfectly suited to the synthesis of a block copolymer by reaction with a polymer bearing an azide functional group at the chain end.

EXAMPLE 3

Synthesis of Halogenated Poly(Methyl Methacrylate)

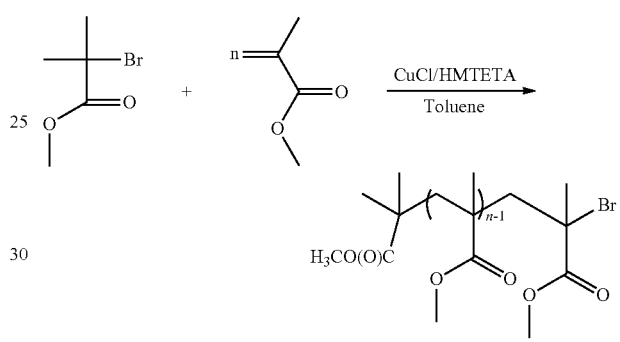

24.75 mg (250 µmol) of CuCl, 136 µl of HMTETA (500 µmol) and 15.23 ml (0.142 mol) of MMA are introduced under a stream of nitrogen into a Schlenk tube provided with a magnetic bar. The mixture is dissolved in 15.3 ml of toluene. After dissolution, 48.76 mg (0.269 mmol) of methyl α-bromoisobutyrate are added and then 3 degassing (vacuum/nitrogen) cycles are carried out. The round-bottomed reaction flask under nitrogen is placed in an oil bath at 60° C. for a period of time of 20 hours.

At the end of the reaction, the reaction mixture is passed through an alumina column with toluene or THF as eluent in order to remove the catalytic copper residues. The solution obtained is concentrated on a rotary evaporator and the polymer is precipitated from methanol. The polymer is dried overnight in an oven at 60° C. under vacuum and 13.5 g of polymer are recovered.

The polymer, characterized by SEC, has an Mn=55 400 g/mol and a PI=1.08. The Tg of the polymer is 113° C.

EXAMPLE 4

Synthesis of Azide-Functional Poly(Methyl Methacrylate)

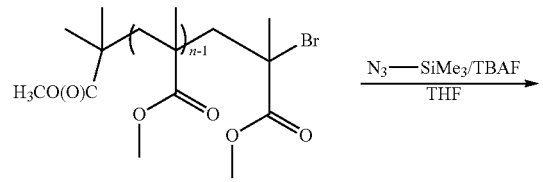

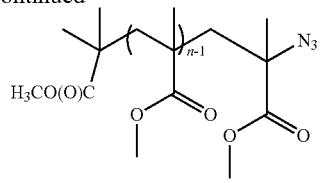
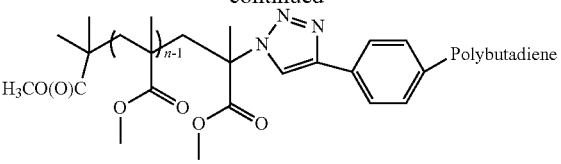

3 g ($5.4\times10^{-5}$ mol, 1 eq.) of bromine-functional PMMA are dissolved in 15 ml of anhydrous THF in a two-necked round-bottomed flask equipped with a magnetic bar. 0.54 ml of a 1M solution of trimethylsilyl azide in THF (10 eq.) and 0.54 ml of TBAF (10 eq.) are added to the polymer. The functionalization reaction is left stirring at 40° C. for 5 days. The reaction medium is concentrated on a rotary evaporator and the polymer is precipitated from methanol. The polymer is dried in an oven under vacuum at 60° C. overnight and 2.8 g of polymer are recovered.

The IR analysis demonstrates the presence of a band at approximately 2115 cm$^{-1}$ corresponding to the vibrational band of the azide.

EXAMPLE 5

Synthesis of the Polybutadiene/Poly(Methyl Methacrylate) Block Copolymer

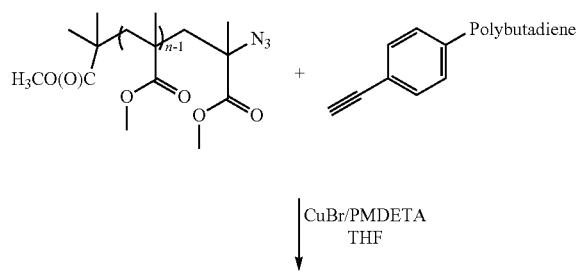

920 mg of azide-functional PMMA (Mn=55 400 g/mol and PI=1.08) ($1.66\times10^{-5}$ mol, 0.9 eq.) and 1 g of acetylene-functional PB (Mn=54 000 g/mol and PI=1.1) ($1.85\times10^{-5}$ mol, 1 eq.) are introduced into and dissolved in 15 ml of anhydrous THF in a two-necked round-bottomed flask equipped with a magnetic bar. After dissolution of the polymers, 20 μl of PMDETA (pentamethyldiethylenetri-amine) are injected under a stream of nitrogen. Several degassing (vacuum/nitrogen) cycles are carried out.

6.875 mg of CuBr are introduced into a predried Schlenk tube equipped with a magnetic bar and the solution of polymers and PMDETA is added to the CuBr under a stream of nitrogen. The reaction medium is heated in an oil bath at 55° C. and left stirring for 48 hours.

The reaction medium is passed through an alumina column in order to remove the copper residues and is then concentrated on a rotary evaporator. The copolymer is precipitated from methanol. The copolymer, redissolved in toluene and then subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine, is dried by stoving at 60° C. for one day. 1.5 g of copolymer are recovered after drying.

The block copolymer, analyzed by IR, demonstrated the disappearance of the two bands corresponding to the acetylene and to the azide. The NMR analysis indicated the disappearance of the signal of the proton of the acetylene at 2.9 ppm. The SEC characterization demonstrated a purity of the copolymer of at least 90% (Mn=105 400 g/mol and a PI=1.2). The copolymer has two Tg values of the order of −79° C. and 113° C.

EXAMPLE 6

Synthesis of the Polybutadiene/Polystyrene Block Copolymer

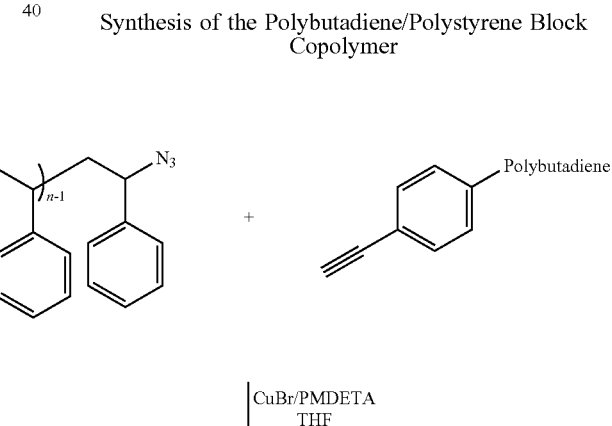

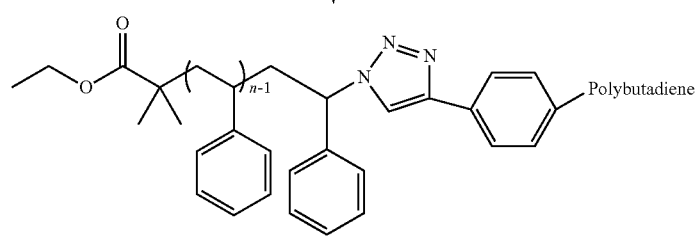

920 mg of azide-functional polystyrene (Mn=2500 g/mol and PI=1.3) (1.96×10$^{-5}$ mol, 0.94 eq.), sold by Sigma-Aldrich, and 1 g of acetylene-functional PB (Mn=48 000 g/mol and PI=1.1), at 94% according to the $^1$H NMR analysis (2.08×10$^{-5}$ mol, 1 eq.) are introduced into and dissolved in 15 ml of anhydrous THF in a two-necked round-bottomed flask equipped with a magnetic bar. After dissolution of the polymers, 23 µl of PMDETA are injected under a stream of nitrogen. Several degassing (vacuum/nitrogen) cycles are carried out.

7.73 mg of CuBr are introduced into a predried Schlenk tube equipped with a magnetic bar and the solution of polymers and PMDETA is added to the CuBr under a stream of nitrogen. The reaction mixture is heated in an oil bath at 55° C. and left stirring for 48 hours.

The reaction medium is passed through an alumina column in order to remove the copper residues and then concentrated on a rotary evaporator. The copolymer is precipitated from methanol. The copolymer, redissolved in toluene and then subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine, is dried by stoving at 60° C. for one day. 1.5 g of copolymer are recovered after drying.

The block copolymer, analyzed by IR, demonstrated the disappearance of the two bands band at 2092 cm$^{-1}$ characteristic of the starting polystyrene and of the band at 2110 cm$^{-1}$ characteristic of the deprotected acetylene. The NMR analysis indicated the disappearance of the signal of the proton of the acetylene at 2.9 ppm. The SEC characterization demonstrated a purity of the copolymer of at least 90% (Mn=51 500 g/mol and a PI=1.2). The copolymer has two Tg values

The invention claimed is:

1. A process for the synthesis of a diene elastomer bearing, at one or each of its chain ends, a group comprising an alkyne functional group, comprising the anionic polymerization of at least one conjugated diene monomer initiated by an organometallic compound comprising an alkyne bond of formula 1:

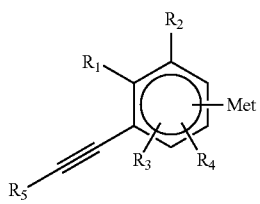

Formula 1 wherein
Met, which can be borne by the ortho, meta or para position with respect to the group comprising the carbon-carbon triple bond, denotes an alkali metal, and
$R_1$ and $R_2$, and also $R_3$ and $R_4$, which can be borne by the ortho, meta or para position, denote, independently of one another, a hydrogen atom, a $C_1$-$C_{15}$ alkyl group, a $C_5$-$C_{15}$ cycloalkyl group, a $C_6$-$C_{15}$ aryl group or a $C_7$-$C_{15}$ arylalkyl group which can be separated from the aromatic nucleus by a heteroatom, and
$R_5$ denotes a $C_1$-$C_5$ alkyl group, a $C_5$-$C_{15}$ cycloalkyl group, a $C_6$-$C_{15}$ aryl group, a $C_7$-$C_{15}$ arylalkyl group or a protective group for the alkyne functional group.

2. A process for the synthesis of a diene elastomer bearing, at one or each of its chain ends, a group comprising an alkyne functional group according to claim 1, further comprising functionalizing of the diene elastomer by reaction of the living diene elastomer resulting from the polymerization with a functionalization, coupling or star-branching agent.

3. The process for the synthesis of a diene elastomer bearing, at one or each of its chain ends, a group comprising an alkyne functional group according to claim 1 further comprising deprotecting of the alkyne functional group when $R_5$ denotes a protective group for the alkyne functional group.

4. A diene elastomer bearing, at one or each of its chain ends, a group comprising an alkyne functional group, corresponding to the following formula 3:

$$(A-E)_n-X$$

Formula 3 wherein:
X denotes a hydrocarbon group of valency n or a group resulting from a functionalization, coupling or star-branching agent comprising at least one atom chosen from O, N, Si or Sn;
A is a monovalent radical corresponding to the following formula 2:

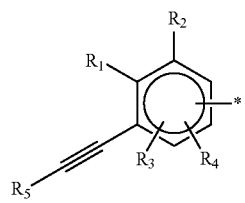

Formula 2 wherein:
$R_1$ and $R_2$, and also $R_3$ and $R_4$, which can be borne by the ortho, meta or para position, denote, independently of one another, a hydrogen atom, a $C_1$-$C_{15}$ alkyl group, a $C_5$-$C_{15}$ cycloalkyl group, a $C_6$-$C_{15}$ aryl group or a $C_7$-$C_{15}$ arylalkyl group which can be separated from the aromatic nucleus by a heteroatom,
$R_5$ denotes a hydrogen atom, a $C_1$-$C_5$ alkyl group, a cycloalkyl group, a $C_6$-$C_{15}$ aryl group, a $C_7$-$C_{15}$ arylalkyl group or a protective group for the alkyne functional group, and
* indicates a point of bonding with the elastomer E,
E, which can be borne by the ortho, meta or para position of A with respect to the group comprising the carbon-carbon triple bond, denotes the diene elastomer, and
n is an integer ranging from 1 to 12.

* * * * *